M. E. DUNKLEY.
FRUIT PEELING MACHINE.
APPLICATION FILED SEPT. 13, 1917.
1,341,738.
Patented June 1, 1920.
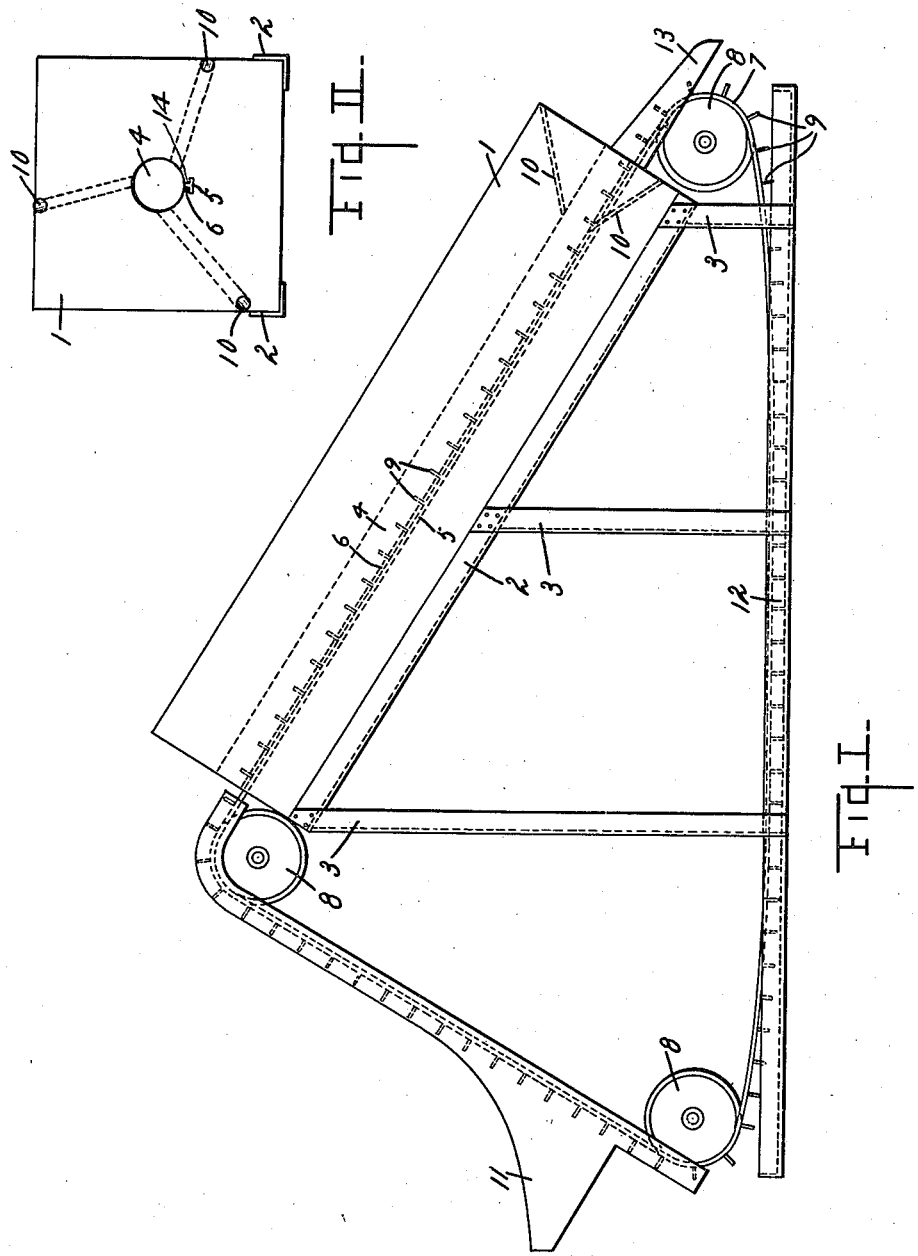
WITNESSES:
Luther Blake
M. Louise Thurston
INVENTOR.
Melville E. Dunkley
BY Chappell Earl
ATTORNEYS.

UNITED STATES PATENT OFFICE.

MELVILLE E. DUNKLEY, OF KALAMAZOO, MICHIGAN.

FRUIT-PEELING MACHINE.

1,341,738.  Specification of Letters Patent.  Patented June 1, 1920.

Application filed September 13, 1917. Serial No. 191,178.

*To all whom it may concern:*

Be it known that I, MELVILLE E. DUNKLEY, a citizen of the United States, residing at the city and county of Kalamazoo, State of Michigan, have invented certain new and useful Improvements in Fruit-Peeling Machines, of which the following is a specification.

This invention relates to improvements in fruit peeling machines.

The objects of this invention are:

First, to provide apparatus for peeling fruit, vegetables, etc.

Second, to provide improved apparatus for carrying out the process described and claimed in my Patent No. 1,236,690 granted Aug. 14, 1917, in which the fruit conveyer is protected from the intense heat of the furnace.

Third, to provide an improved apparatus in which the gas jets are so directed as to envelop the fruit or vegetables being peeled, in a swirling mass of flame whereby the skin of the fruit or vegetable is quickly and evenly cindered and disintegrated.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing forming a part of this specification, in which:

Figure I is a more or less diagrammatic elevation of my improved apparatus.

Fig. II is an elevational view of the lower end of the burner.

In the drawing, similar reference characters refer to similar parts throughout the several views.

Referring to the drawing, the reference character 1 indicates the body of the furnace which is composed of fire brick or other resistive material and is supported in an inclined position by means of the angles 2 and the posts 3. The body 1 is provided with a longitudinal bore 4 and a conveyer receiving channel 5 which extends parallel with the bore 4 and opens thereinto through the restricted slot 6.

The fruit conveyer 7 is mounted upon pulleys 8 and travels through the conveyer receiving channel 5. The conveyer 7 is provided with flights 9 which extend through the slot into the bore 4.

The body 1 is provided adjacent its lower end with burner flues 10 which are inclined toward the upper end of the body and open into the bore 4 in planes tangential thereto in such a manner that the jets of flame from the burner are caused to swirl about the bore 4 and envelop the fruit or vegetables in a mass of swirling flame whereby the skin of the fruit or the vegetable is quickly and evenly cindered and disintegrated.

A hopper 11 provides means whereby the fruit or vegetables may be fed to the conveyer.

Between the two lower pulleys 8 I provide a tank 12 for holding a cooling liquid, such as water, into which the conveyer dips for the purpose of cooling the same.

The lower end of the furnace is provided with a discharge spout 13 which discharges the fruit or vegetables into a cooling tank, or any other desired receptacle.

It will be clear from the above description that by providing the conveyer receiving channel 5, which communicates with the bore 4 through the restricted slot 6, overhanging portions 14 are formed which protect the conveyer from the intense direct heat of the furnace. The tangential arrangement of the burner flues 10 relative to the bore 4 also provide means whereby the fruit or vegetables is completely enveloped in a mass of swirling flame, thereby insuring even cindering and disintegration of the skin of the fruit or vegetable.

The upward inclination of the furnace also causes the fruit or vegetables to roll from the upper end thereof to the lower end, thereby presenting all sides of the fruit or vegetable to the influence of the heat and thereby further insuring the even cindering and disintegration of the skin thereof. In this connection, it should be noted that the flights 9 of the conveyer 7 first act to convey the fruit to the top of the furnace and then act as stops to prevent the fruit from rolling to the bottom of the furnace at too great a speed.

While I have illustrated the channel 5 for receiving the conveyer as being positioned at the bottom of the bore 4, it will be clear that it might be positioned at any part of the periphery of the bore 4, and it will also be clear that the bore 4 may be other than circular in cross section. For these reasons I desire it to be understood that my invention is not limited to the specific features illustrated and described, but may assume other embodiments and modifications within the scope of the appended claims.

Having thus described my invention, what I claim as new and desire to secure by Letters Patent is:—

1. In a structure of the class described, the combination with a furnace comprising walls of heat resistive material having an inclined bore therethrough open at both ends, the walls of said furnace being provided with a conveyer receiving channel extending parallel with said bore and opening thereinto through a restricted slot, of an endless conveyer mounted to travel in said channel and provided with flights extending through said slot and into said bore, the walls of said furnace being provided adjacent its lower end with burner flues opening into said bore.

2. In a structure of the class described, the combination with a furnace having an inclined bore extending therethrough open at both ends, the said walls being provided with a conveyer receiving channel extending parallel with said bore and opening thereinto through a restricted slot, of a conveyer mounted to move in said channel and provided with flights extending through said slot into said bore, the walls of said furnace being provided with burner flues opening thereinto in planes tangential thereto.

3. In a structure of the class described, the combination with a furnace having an inclined bore extending therethrough open at both ends, the said walls being provided with a conveyer receiving channel opening thereinto through a restricted slot, of a conveyer mounted to move in said channel and provided with flights extending through said slot into said bore, the walls of said furnace being provided with burner flues opening thereinto.

4. In a structure of the class described, the combination with a furnace provided with an inclined bore extending therethrough, of means for heating said furnace, a conveyer provided with means for conveying fruit or vegetables along said bore, and means for protecting the said conveyer from the direct heat of the furnace.

In witness whereof I have hereunto set my hand and seal in the presence of two witnesses.

MELVILLE E. DUNKLEY. [L. S.]

Witnesses:
LUELLA G. GREENFIELD,
MARGARET L. GLASGOW.